United States Patent [19]

Crisci

[11] 4,437,663

[45] Mar. 20, 1984

[54] GOLF CLUB

[76] Inventor: Clem C. Crisci, 1103 S. Croton Ave., New Castle, Pa. 16103

[21] Appl. No.: 358,274

[22] Filed: Mar. 15, 1982

[51] Int. Cl.³ ............................................ A63B 53/14
[52] U.S. Cl. ..................................... 273/81.2; 403/349
[58] Field of Search .................... 273/81.2, 80 D, 80.1; 403/349, DIG. 7, 348, 350, 351, 352, 343, 321

[56] References Cited

U.S. PATENT DOCUMENTS

| | | | |
|---|---|---|---|
| 782,955 | 2/1905 | Emens | 273/80.1 |
| 796,802 | 8/1905 | Brown | 273/80.1 |
| 1,586,469 | 5/1926 | Revell | 273/81.2 |
| 1,623,523 | 4/1927 | Bourke | 273/80.1 |
| 1,696,462 | 12/1928 | Victor | 403/349 X |
| 4,158,983 | 6/1979 | Amico | 403/349 X |

Primary Examiner—George J. Marlo
Attorney, Agent, or Firm—Harpman & Harpman

[57] ABSTRACT

A two-part golf club having separate handle and head portions arranged to be taken apart midway along the shaft for ease of storage and transportation and easily reassembled for use. The club portions are removably secured to one another by an elongated pin having a tab on its free end engaging dual spiral ramps so as to move the pin longitudinally and transversely upon the partial rotation of the same. This action effectively locks the portions of the club together with the overall balance of the club being improved due to the nature and positioning of the inner connecting portions.

5 Claims, 6 Drawing Figures

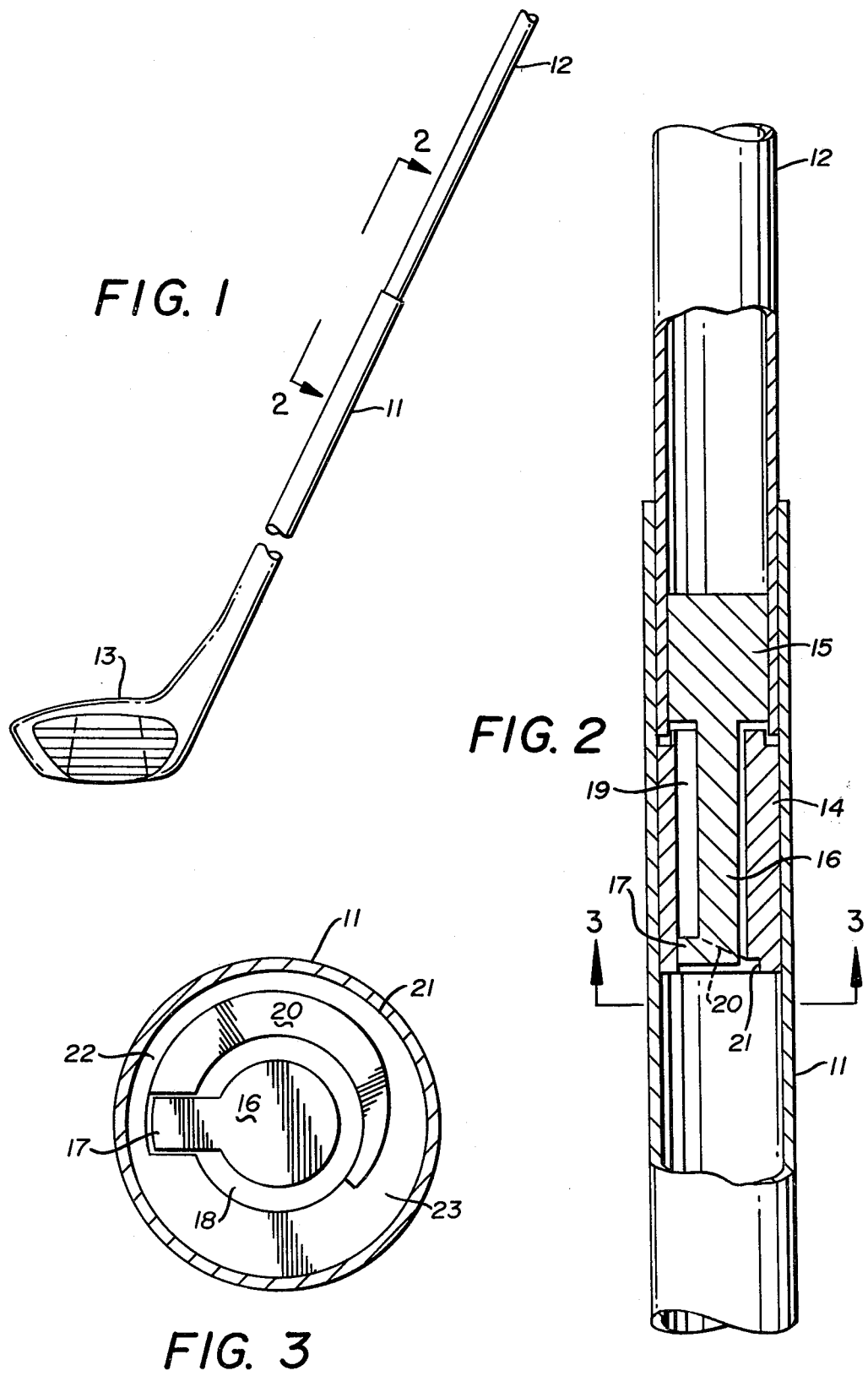

4,437,663

GOLF CLUB

BACKGROUND OF THE INVENTION (1) Field of the Invention

This invention relates to golf clubs used in the game of golf, which clubs can be taken apart in separate portions.

(2) Description of the Prior Art

Prior art devices of this type have used a variety of different attachments to secure the handle to the so-called head of the club. See for example U.S. Pat. Nos. 796,802, 782,955, and 1,623,523.

In U.S. Pat. No. 796,802 a two-part golf club is disclosed, the parts of which are secured together at a point adjacent the head of the club, the two-parts having interengaging members which are held in engagement by a spring.

U.S. Pat. No. 782,955 shows a golf club having a two-part configuration with the head portion having a pair of arms which engage cams on a movable collar. Rotation of the collar against the arms holds the portions of the club together. The attachment part of the portions is adjacent the head of the club.

In U.S. Pat. No. 1,623,523 a two-part golf club is disclosed wherein the two portions are held together by a pair of oppositely disposed studs on the upper portion, which movably engage tapered slots in the head portion. A spring urged follower holds the studs within the slots which are near the head portion of the club.

Applicant's device has separate upper and lower portions which are joined to one another approximately midway between the handle and the head of the club. Applicant's golf club maintains its balance despite the two-part configuration and doesn't require a separate spring urged mechanism to remain in locked position as prior art does.

SUMMARY OF THE INVENTION

A two-part golf club that can be easily taken apart midway along the shaft into a handle portion and a head portion. The division of the club at its midway point improves its balance and its overall playing characteristics. The club portions are removably secured to one another by an elongated pin having a tab on its free end engaging dual spiral ramps so as to move the pin longitudinally and transversely upon the partial rotation of the same. This action effectively engages and locks the portions of the club together.

DESCRIPTION OF THE DRAWINGS

FIG. 1 is a side elevation of the improved golf club with portions broken away;

FIG. 2 is an enlarged cross sectional view of a portion of the club as seen in FIG. 1 with locking means in unlocked position;

FIG. 3 is a section on lines 3—3 of FIG. 2;

DESCRIPTION OF THE PREFERRED EMBODIMENT

Figure 5:
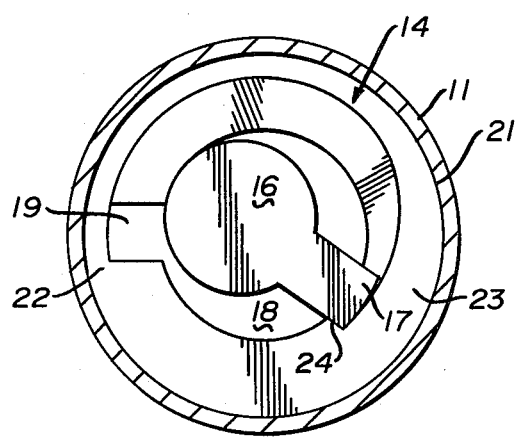
FIG. 5 is a section on lines 5—5 of FIG. 4.

A two-part golf club can be seen in FIGS. 1, 2 and 3 of the drawings comprising an elongated tubular shaft having a lower portion 11 and an upper portion 12. The lower portion 11 has a club head 13 on one end with a locking fitting 14 inwardly spaced from the opposite end. The upper portion 12 has a hand grip (not shown) and a cylindrical plug 15 secured in its opposite end with a pin 16 extending outwardly therefrom. The pin 16 has a sidewardly extending tab 17 on its end opposite the plug 15. The pin 16 is resilient.

Referring specifically to FIG. 2 of the drawings, it will be seen that the outer diameter of the upper portion 12 is slightly smaller than the inner diameter of the lower portion 11 so that the one portion will slidably fit within the other. The pin and tab 16 and 17 are movable into and register with a passageway 18 and a rectangular slot 19 in the lock fitting 14, the slot 19 being formed in the side of the passageway 18. The lock fitting 14 can be seen in FIG. 6 of the drawings, inverted for clarity, having a recessed area therein which extends partially around the passageway 18 which is generally annular. The recessed area is defined by an inclined ramp 20 and an annular shoulder 21 adjacent thereto. The ramp 20 forms a surface which extends upwardly from the rectangular slot 19 decreasing in width as it ascends in the form of a partial spiral. The annular shoulder 21 increases in width corresponding to the decreasing width of the ramp 20. The annular shoulder 21 is in its narrowest configuration adjacent the slot 19 as indicated at 22 and at its widest configuration as indicated at 23 in FIGS. 3, 5 and 6 of the drawings.

Figure 6:
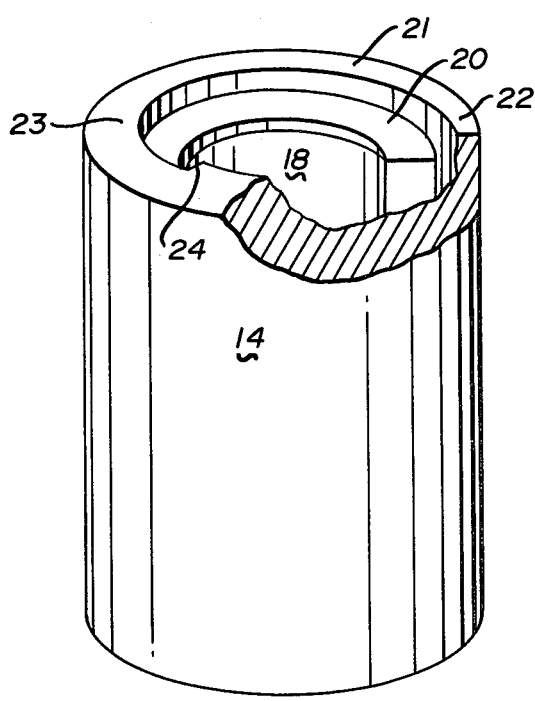
FIG. 6 is an inverted perspective view of a portion of the locking means with parts broken away.
Figure 4:
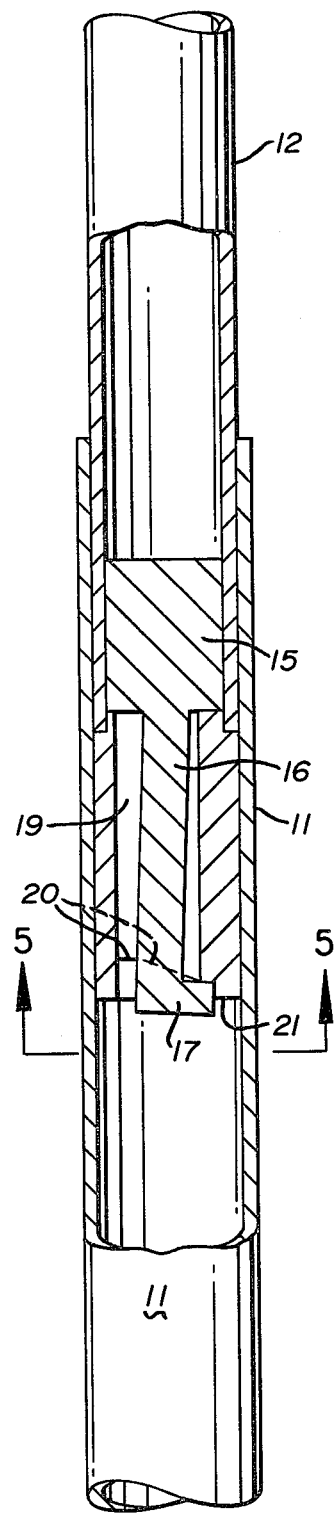
FIG. 4 is an enlarged cross sectional view similar to FIG. 2 showing the lock means in locked position.

Referring now to FIGS. 2, 3, 4 and 5 of the drawings, the lower portion 11 and the upper portion 12 of the two-part golf club can be seen engaged in one another. Rotation of the upper portion 12 and the corresponding pin and tab, 16 and 17, within the lock fitting 14 engages the surface of the tab 17 on the ramp 20. As the tab 17 ascends the ramp 20, the pin 16 is forced off its normal longitudinal axis by the engagement of the tab 17 with the annular shoulder 21 bending the pin 16 sidewardly, thus locking the parts together. When the tab 17 is in locked position, as seen in FIGS. 4 and 5 of the drawings, the tab 17 has reached the point of maximum rotation on the ramp 20 and is engaging the wide portion 23 of the annular shoulder 21 and abuts a stop 24.

From the foregoing it will be seen that to unlock the upper portion 12 and the lower portion 11, the rotation of the portions would be reversed whereby the tab 17 would descend the ramp 20 to a point aligned with the rectangular slot 19 within the lock fitting 14. At this point, the tab 17 is no longer wedged against the annular shoulder 21 and the upper and lower portions 11 and 12 can be separated.

Although but one embodiment of the present invention has been illustrated and described, it will be apparent to those skilled in the art that various changes and modifications may be made therein without departing from the spirit of the invention and having thus described my invention what I claim is:

1. A two-part golf club comprising a lower portion and an upper portion, a hand grip on said upper portion and a club head on said lower portion, means for movably securing said upper and lower portions together wherein said means comprises a plug secured in the end of one of said club portions, an elongated pin extending from said plug, a sidewardly extending tab on the free end of said pin, a lock fitting having an opening therethrough, a slot in the side of said opening and said lock fitting secured in the end of other said club portions, the ends of said club portions having said plug and said lock fitting arranged for mutual engagement, a recessed area in said lock fitting comprising a ramp in the form of a partial spiral, an offcenter annular shoulder adjacent said ramp, said tab slidable on said ramp and against said annular shoulder to a locked position when said portion having said plug and pin is rotated.

2. The two-part golf club of claim 1 wherein said opening is an axial bore in said lock fitting of a diameter greater than the diameter of said pin, and said annular shoulder is of a progressively increasing width from a first position adjacent said slot.

3. The two-part golf club of claim 1 wherein said pin is resilient.

4. The two-part golf club of claim 1 wherein said ramp is of progressively decreasing width from a first position adjacent said slot.

5. The two-part golf club of claim 4 wherein the ramp is of a progressively decreasing width from said first position adjacent said slot, a portion of said annular shoulder extending inwardly at the end of said ramp so as to form a stop against which said tab engages.

* * * * *